UNITED STATES PATENT OFFICE.

EARLE B. PHELPS AND ALBERT F. STEVENSON, OF RIDGEWOOD, AND JOHN C. BAKER, OF RIDGEFIELD PARK, NEW JERSEY, ASSIGNORS TO ALBERT W. JOHNSON, OF NEW YORK, N. Y.

MANUFACTURE OF BUTTER FAT.

1,404,054.  Specification of Letters Patent.  Patented Jan. 17, 1922.

No Drawing.  Application filed January 31, 1920. Serial No. 355,338.

*To all whom it may concern:*

Be it known that we, EARLE B. PHELPS and ALBERT F. STEVENSON, residing at Ridgewood, county of Bergen, State of New Jersey, and JOHN C. BAKER, residing at Ridgefield Park, county of Bergen, and State of New Jersey, all citizens of the United States, have invented certain new and useful Improvements in the Manufacture of Butter Fat, of which the following is a full, clear and exact description.

In the commercial production and handling of butter, there is a certain and inevitable deterioration or spoiling of the product due to improper methods of manufacture, to storage at too high a temperature or for too protracted periods and other causes. The usual result of this is a butter of bad flavor, marketable, if at all, at a lower price than that obtainable for the better grades, while in many cases the deterioration may be such as to render the butter unmarketable without some kind of renovation for its redemption.

Many processes are known and have been practiced for the renovation of butter, all having the same ultimate object in view—its conversion into a product of better quality, especially as regards its flavor. It is only necessary, for purposes of the present case, to state that such processes most frequently involve treatment of the deteriorated butter with an alkaline wash water, aeration, treatment by means of live steam, or some combination of these methods.

We propose a different method of treatment of such deteriorated or inferior butter in order to produce a marketable product and by our process we recover not butter, but pure butter fat from butter, as we have found by experience in the matter that a product of prime quality may be thus produced, although the butter from which it is produced may have been too rancid or strong to be brought to a marketable condition as a first class article. The fats which we have been able to produce by our process we have found to be much improved in flavor and consequently in commercial value.

In any process of treating butter for the recovery of pure butter fat, which involves melting of the same, there develops primarily a separation of the material into three strata, an upper stratum or layer of practically pure butter fat, a bottom layer of milky water containing the water soluble constituents, and an intermediate layer containing emulsified fat and some curd. It is not possible by any simple or practical mechanical means, such as the use of some form of centrifugal separator, to effect any further and substantial separation of the fat and water from the ingredients comprising this intermediate layer, and its composition suggests a condition which our further investigations have demonstrated that butter is not a mass of completely agglomerated or coalesced fat containing water and curd in suspension, but that it is a mixture of such coalesced fat with some water and some fat emulsified in water.

By way of illustration of this somewhat complex condition, if we assume that the aqueous portion represented a body of water, and the pure fat dry land, then the cream will be represented by a group of islands, and butter, by a group of lakes each containing a group of islands. On melting such a mixture, the islands of emulsified fat cannot come together with the main body of the fat, but remain as a separate phase, forming the intermediate layer or stratum above referred to.

In the commercial recovery of pure butter fat from butter, practically complete separation is a first essential, owing to the high value of the fat. The fact that pure butter fat, with its manifest advantages over butter, has not heretofore been economically recovered from butter by the simple expedient of melting and drawing off the top layer, is evidence of the commercial impracticability of such a procedure, which goes to confirm the theoretical considerations to which our investigations have led.

In a copending application filed by us, Serial No. 306,808, filed June 26, 1919, we have elaborated a process of obtaining pure butter fat from milk and cream, and experiments on a commercial scale with such process have demonstrated that the principles underlying that process are also applicable to the recovery of pure butter fat from butter generally, and that by proper manipulation, a product may be obtained which is practically indistinguishable from that obtained directly from milk.

Our new process accordingly is as follows:

We melt the butter to be treated at a temperature of about 135° F. and when brought to a fluid state we wash it by passing it through a cream or centrifugal separator together with warm water about four times its volume. The mixture of butter fat and emulsion which issues from the separator is then treated in the same way that we treat the cream at this stage in our process above refered to. In other words, it is washed in a second separator with a dilute acid solution of such a strength as to give a hydrogen ion concentration greater than the iselectric point of casein, or approximately $P^h = 4.5$. The resulting product is then subjected to a second centrifugal treatment after being combined with pure wash water, and from the separator there then issues as the result of the final operation a clear, water-free oil, which is pure butter fat. The temperature of the wash water should be in all cases from 120° to 150° F.

We find that this process may be modified in many respects without departure from the basic principles involved. We may, for example, omit the preliminary washing with water and begin with the acid treatment, although for mechanical reasons this preliminary treatment is desirable. We may also, and in fact must at times vary the actual amount of acid employed according to the initial acidity of the butter itself. For this reason it is difficult to state the actual proportion of acid required, as the reaction necessary is the controlling factor in this regard. Any suitable acid, such as hydrochloric acid, is suitable for the purpose, The proportion of pure butter fat recoverable from butter by this process is approximately ten per cent in excess of that which would result from the mere melting of the butter and drawing off the fat. This in itself is a complete demonstration of the practical and commercial value of the process.

What we claim as our invention is:

1. The process herein set forth of recovering pure butter fat from butter which consists in melting the butter, washing it with pure water, then with acidulated water, and finally with pure water and separating in each step the wash water from the fat.

2. The process of recovering pure butter fat from butter which consists in washing the butter with warm water, separating out the wash water, then washing the fat product with warm acidulated water and again separating out the wash water and finally washing the fat with pure warm water and separating out the pure butter fat.

3. In the process of recovering pure butter fat from butter, the step herein described of washing the melted butter with water containing acid in an amount to give to the mass a hydrogen ion concentration greater than the iselectric point of casein.

In testimony whereof we hereunto affix our signatures.

EARLE B. PHELPS.
ALBERT F. STEVENSON.
JOHN C. BAKER.